Figure 2:
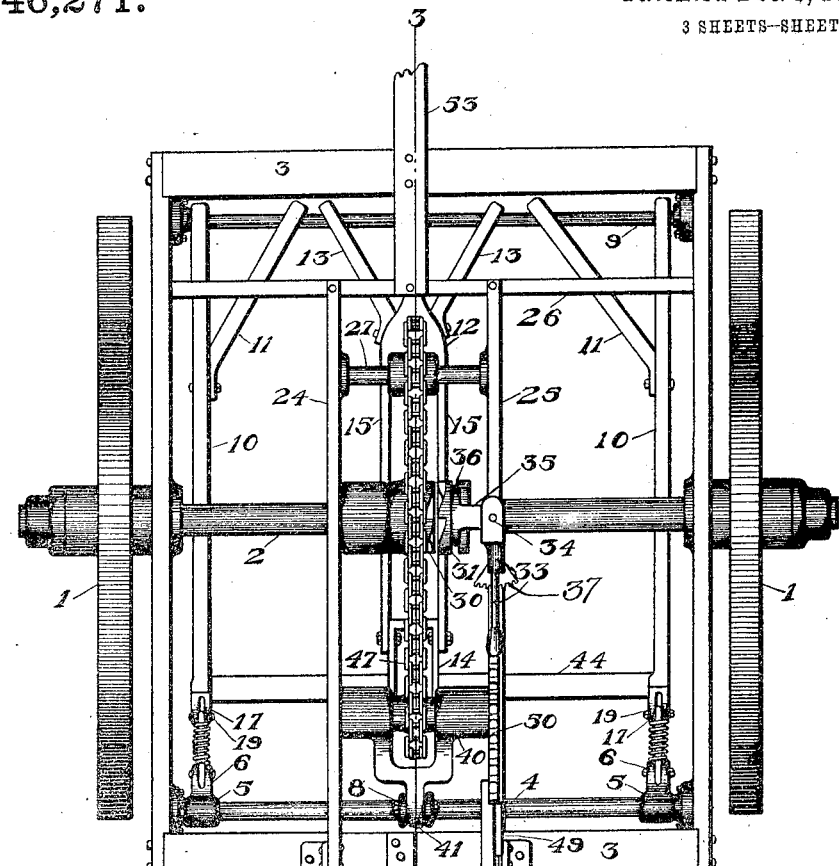

U. G. COLWELL.
WEEDER.
APPLICATION FILED MAR. 16, 1912.
1,046,271.
Patented Dec. 3, 1912.
3 SHEETS—SHEET 1.
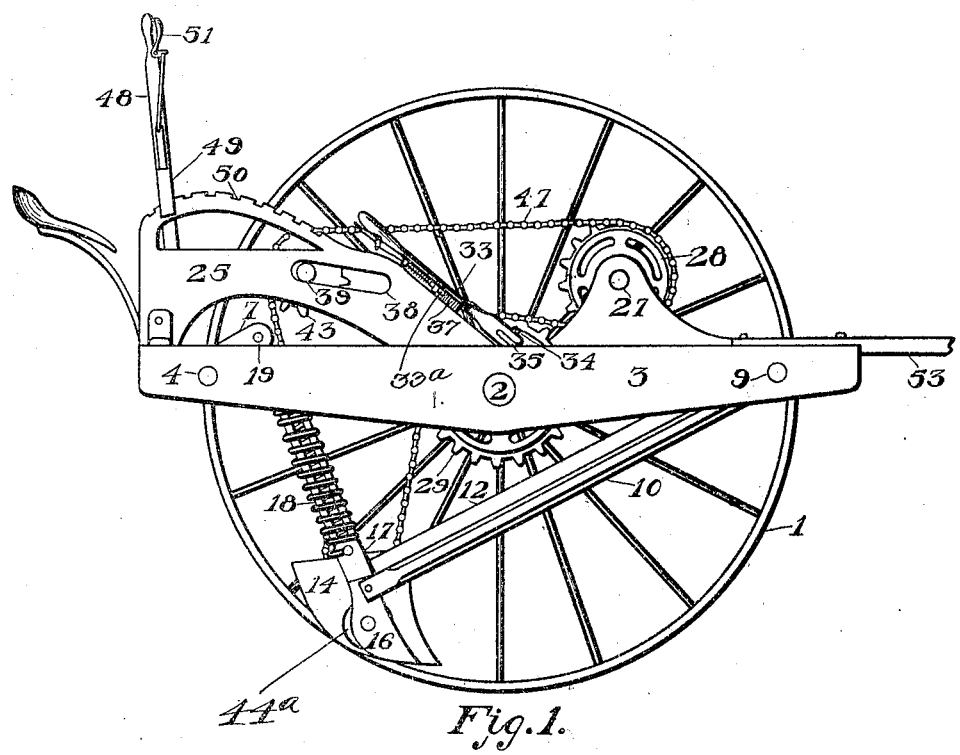
Fig. 1.
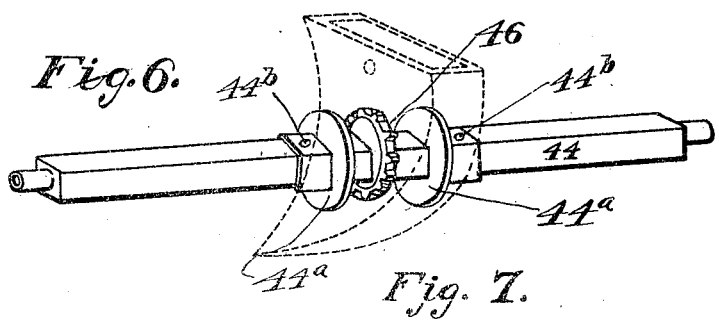
Fig. 6.
Fig. 7.
Witnesses
Robt. Meyer.
Inventor
U. G. Colwell.
By D. Swift & Co.
Attorneys

U. G. COLWELL.
WEEDER.
APPLICATION FILED MAR. 16, 1912.

1,046,271.

Patented Dec. 3, 1912.
3 SHEETS—SHEET 2.

Witnesses
Rohe Meyer.
Francis G. Boswell.

Inventor
U. G. Colwell.
By D. Swift & Co.
Attorneys

UNITED STATES PATENT OFFICE.

ULYSSES G. COLWELL, OF PAHA, WASHINGTON.

WEEDER.

1,046,271.  Specification of Letters Patent.  Patented Dec. 3, 1912.

Application filed March 16, 1912. Serial No. 684,258.

*To all whom it may concern:*

Be it known that I, ULYSSES G. COLWELL, a citizen of the United States, residing at Paha, in the county of Adams and State of Washington, have invented a new and useful Weeder; and I do hereby declare the following to be a full, clear, and exact description of the invention, such as will enable other skilled in the art to which it appertains to make and use the same.

This invention relates to a new and useful weeder.

The invention aims to provide a device of this nature, which not only weeds a plowed field, but also pulverizes or breaks the soil, and turns the roots of the weeds to the surface.

The invention further aims to devise a weeder having various improved features of construction.

One of the features of the construction is the provision of means for gaging the depth of the shovels in the soil.

Another feature of the construction resides in a revoluble shaft rectangular in cross section, to revolve under the soil, to turn the roots of the weeds to the surface.

The invention comprises further features, and combination of parts, as hereinafter set forth, as shown in the drawings and claimed.

Figure 5:
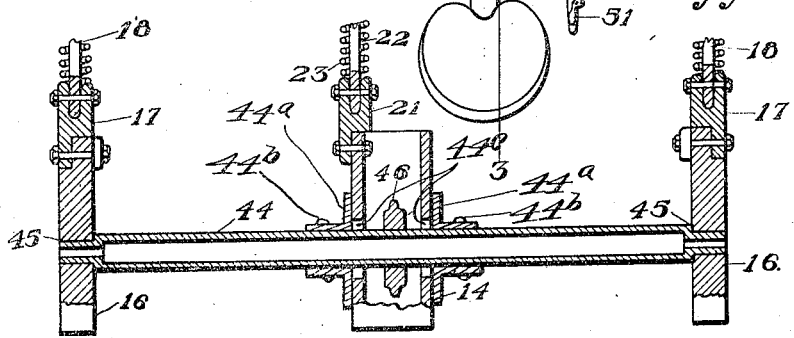
Figure 3:
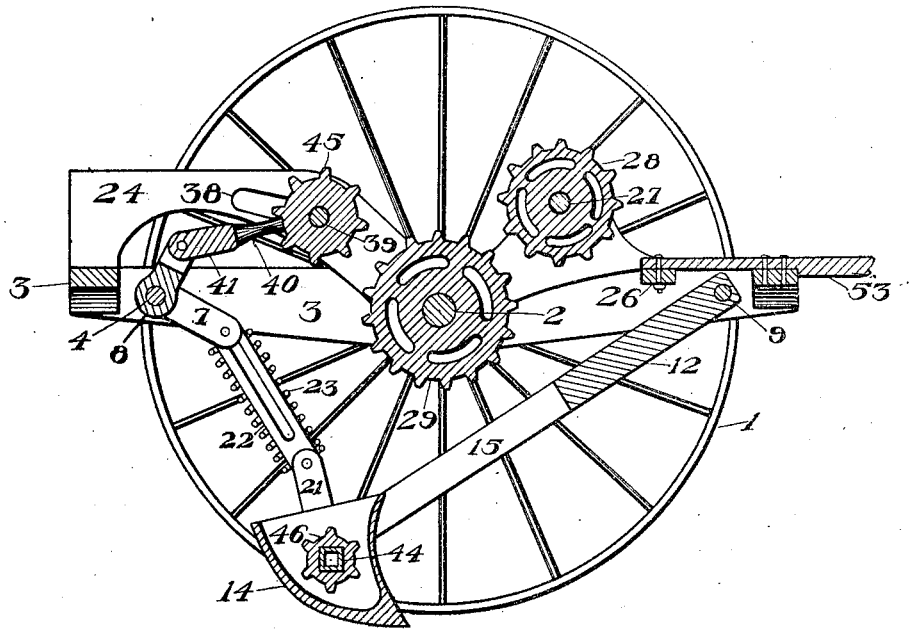
Figure 4:
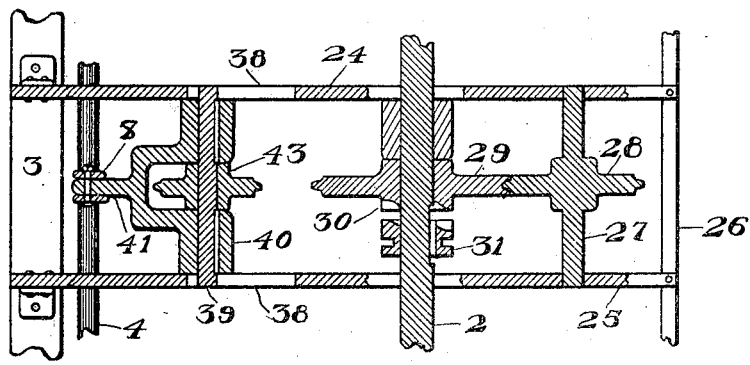

In the drawings:—Figure 1 is a view in side elevation of the improved weeder, showing the same constructed in accordance with the invention, with one of its supporting wheels removed. Fig. 2 is a plan view of the weeder. Fig. 3 is a sectional view on line 3—3 of Fig. 2. Fig. 4 is a detail view of a portion of the machine. Fig. 5 is a rear view of the lower portions of the shovels, showing them partly in section. Fig. 6 is a detail view of the revoluble shaft rectangular in cross section, showing the sprocket wheel thereon, and the central shovel in dotted lines. Fig. 7 is a detail view of a modified form of shaft 44.

Referring more particularly to the drawings, 1 designates the supporting wheels, which are fixed to the drive axle 2 to rotate therewith. Mounted on the axle 2 is a frame 3 rectangular in plan view. Journaled in bearings at the rear of the frame 3 is a rock shaft 4, from which adjacent each end thereof an arm 5 projects forwardly. The arms 5 are forked, as shown at 6. Radiating, one at right angles to the other, from the central portion of the rock shaft are two arms 7 and 8, each of which is forked. Journaled in the forward portion of the frame 3 is a rod 9. Pivotally mounted on the rod 9, one at each end is a bar 10, there being brace bars 11, one for bracing each of the bars 10 relative to the rod 9. Pivotally mounted on the rod 9 at its central portion is a beam 12. This beam 12 is braced relative to the rod 9 by the brace bars 13. The beam 12 terminates rearwardly in two forks, which are fixed at their rear ends to the central shovel 14. The forks are denoted by the numeral 15. The bars 10 are fixed at their rear ends to the shovels 16, to the upper forked ends 17 of which slotted links 18 are pivoted. These links are in turn pivoted to the forked arms at the ends of the rocking shaft 4, the pivot pins 19 passing through the slots of the links. Coil springs 20 surround the links between the end forked arms of the shaft 4, and the forked upper ends 17 of the shovels 16, so that when the shaft 4 is rocked, the shovels will be forced yieldably in the soil. The central shovel is hollow, as shown, and is provided with a forked member 21, between the arms of which one end of a slotted link 22 is pivoted. The upper end of the link 22 is connected to the forked arm 7 of the shaft 4, by passing a pivot pin through the forks of the arm 7 and through the slot of the said link 22. The link 22 has a coil spring surrounding it, which acts between the forked member 21 and the arm 7. This spring 23 assists in yieldably forcing the shovels in the soil.

A pair of plates 24 and 25 arranged on their edges and in parallel relations are connected to the rear end of the frame, and to a bar 26 at the forward end of the frame. The drive axle 2 extends through bearings of the plates 24 and 25. Mounted in bearings of the forward ends of the plates 24 and 25 is a shaft 27, with which a sprocket wheel 28 rotates. Loosely journaled on the drive axle 2 is a sprocket wheel 29, having a clutch hub 30. Keyed to rotate with the axle 2, but to slide thereon is a clutch member 31, which is designed to coöperate with the clutch hub, for throwing the sprocket wheel in and out of gear with the axle 2. Pivoted to the plate 25 is a lever 33, to one end of which as at 34 an arm 35 of the clutch throwing device 36 is pivoted. The clutch throwing device embraces in a groove of the clutch member. By shifting the lever 33 the clutch member may be thrown in engagement with the clutch hub. The lever 33 is provided with an offset portion, to engage any one of the teeth 37 of the plate 25 for holding the lever in adjusted position.

The plates 24 and 25 are formed with guide slots 38. Mounted in the guide slots, so as to slide therein are the ends of the shaft 39, which is mounted revolubly in the U-shaped frame 40. The U-shaped frame 40 is provided with a rearwardly extending lug 41, which is pivoted to the fork arm 8 of the shaft 4. Fixed to the shaft 39 and between the side arms of the frame 40 is a sprocket wheel 43.

Extending through the central shovel transversely thereof is a shaft or tubing 44, which is rectangular in cross section. To prevent dirt from entering the central shovel through the openings 44ᶜ of the shovel, plates 44ᵃ are secured to the shaft 44 at 44ᵇ. The ends of the shaft 44 are journaled in sockets 45 of the shovels 16. Fixed to the central portion of the shaft 44, so as to rotate therewith is a sprocket 46. This sprocket 46 is located in the hollow portion of the shovel 14. Traveling about the sprocket 46, the sprocket 43, the sprocket 29 and the sprocket 28 is a sprocket chain 47. When the sprocket 29 is thrown in gear with the drive axle 2, motion is imparted to the chain 47, which will in turn drive the shaft 44. When the shaft 44 is driven, while the same is under the soil, or partially under the soil, the weeds will be dislodged. If the shaft is revolving under the soil, the roots of the weeds will be turned or uprooted to the surface. It has been found by experience that a shaft rectangular in cross section will accomplish this purpose, without the weeds and the roots hanging to the same.

A lever 48 projects rigidly from the shaft 4 and at right angles thereto. This lever 48 is designed for rocking the shaft 4, the same being provided with a dog 49, to be thrown in engagement with any one of the teeth of the rack 50, for holding the lever 48 in adjusted positions. This dog 49 is operated by the hand grip 51. When the shaft 4 is rocked in one direction or the other by the lever 48, the shovels are forced yieldably in the soil, and at the same time the frame 40 is moved forwardly, the same being guided by virtue of the shaft 39 and the guide slots 38, which will allow the sprocket chain to give out. When the frame 40 moves rearwardly, the chain will be taken up. In other words, the chain will always remain in proper coöperation with the sprockets.

The usual draft pole 53 is secured to the frame of the machine. The usual form of seat is arranged rearwardly of the frame 3.

The invention having been set forth, what is claimed as new and useful is:—

1. In a weeder, a frame, a drive axle mounted in bearings thereof and having supporting wheels movable therewith, a rearwardly and downwardly extending frame pivoted to the forward portion of the first frame and terminating in a plurality of shovels, a rock shaft journaled in the first frame and having yieldable connections with the shovels, a revoluble device journaled in bearings of the shovels, a sprocket and chain mechanism driven by the axle for rotating the revoluble device, a slidable frame carrying one of the sprockets and having connections with the rock shaft, whereby as the rock shaft is rocked to force the shovels yieldably in the soil, the slidable frame will be shifted to take up or let out the slack of the chain.

2. In a weeder, a plurality of suspended shovels, lifting and lowering means having yieldable connections with the shovels for forcing them yieldably in the soil, a revoluble elongated device rectangular in cross section mounted in the shovels, a sprocket and chain mechanism for driving the device, a slidable frame carrying one of the sprockets and having connections with the means, whereby as the shovels are raised and lowered, the slidable frame will be shifted to take up and let out the slack in the chain, and means for driving the mechanism.

3. In a weeder, a plurality of suspended shovels, a revoluble elongated member journaled in bearings on the shovels, a sprocket and chain mechanism for revolving the revoluble member, and a slidable frame having connections with the shovels and carrying one of the sprockets, and lifting and lowering means for actuating the shovels and the slidable frame simultaneously.

In testimony whereof I have signed my name to this specification in the presence of two subscribing witnesses.

ULYSSES G. COLWELL.

Witnesses:
W. O. MILLER,
JOICEY S. AMMONS.